(No Model.) 3 Sheets—Sheet 1.
A. WRIGHT.
MAXIMUM AND MINIMUM RECORDING ELECTRIC METER.
No. 583,160. Patented May 25, 1897.
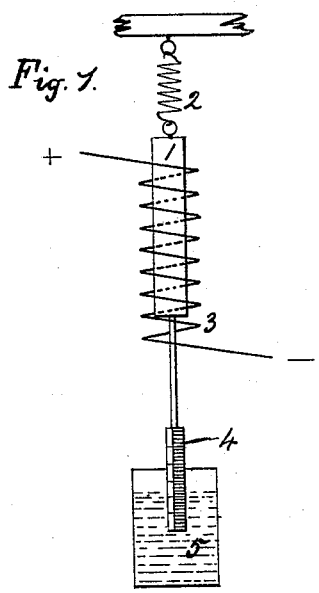
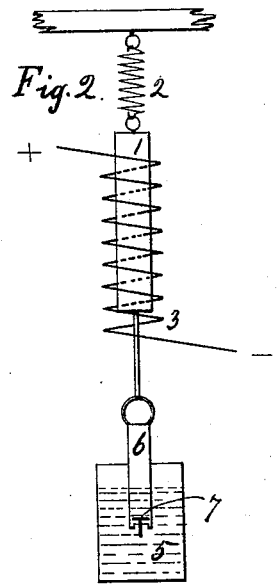
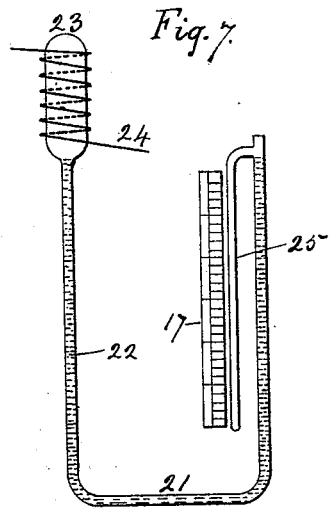
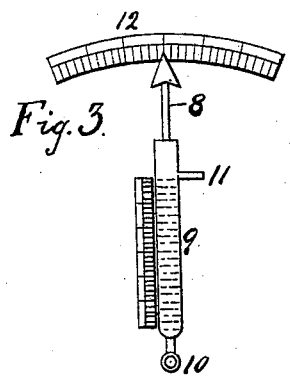
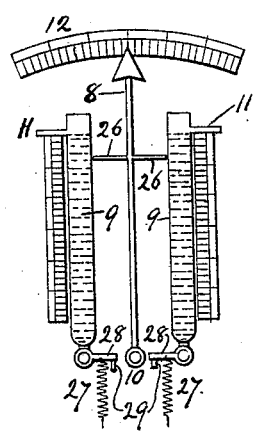
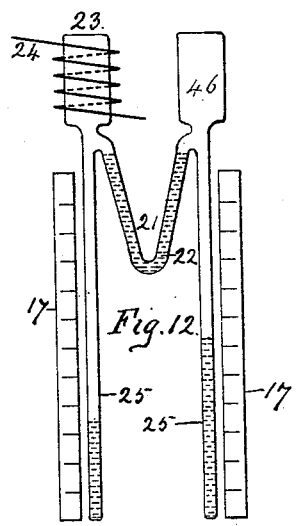
Witnesses;
F. T. Chapman
C. E. Marshall
Inventor,
Arthur Wright
By Joseph Lyons
Attorney (No Model.) 3 Sheets—Sheet 2.
A. WRIGHT.
MAXIMUM AND MINIMUM RECORDING ELECTRIC METER.
No. 583,160. Patented May 25, 1897.
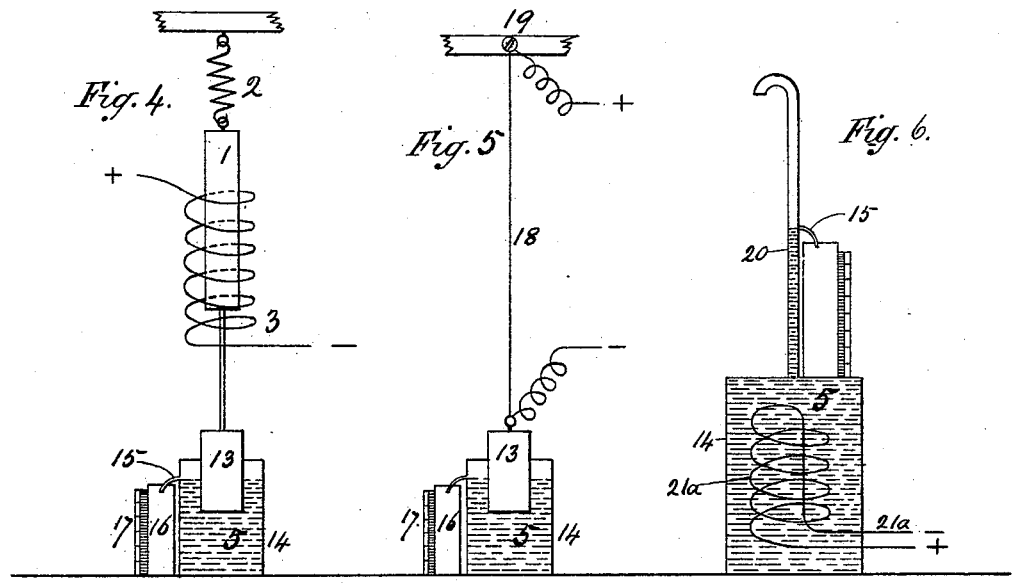
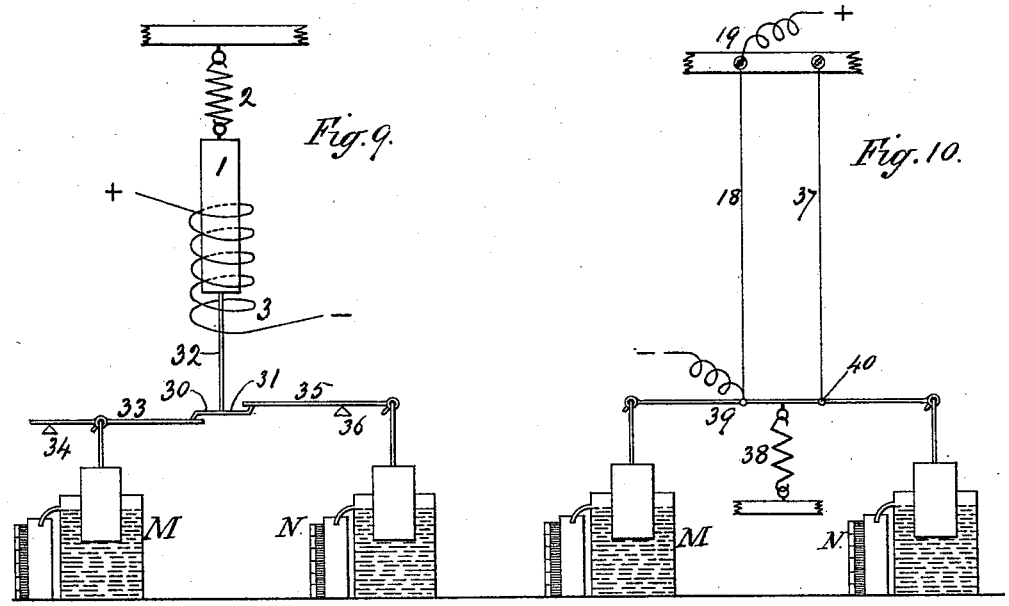
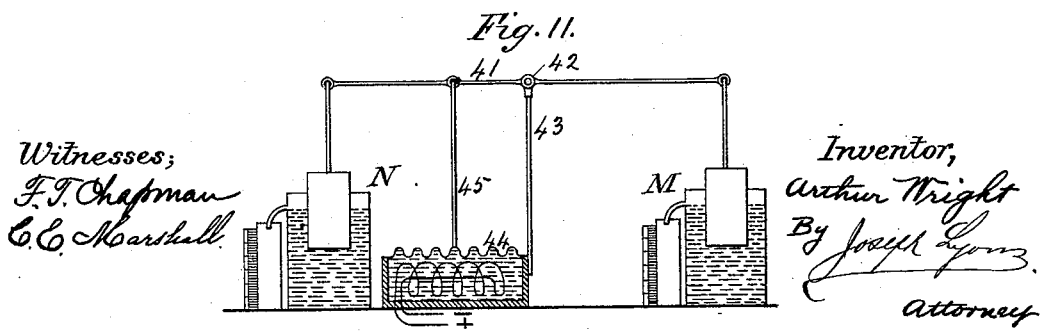
Witnesses:
F. T. Chapman
C. E. Marshall
Inventor,
Arthur Wright
By Joseph Lyons
Attorney (No Model.) 3 Sheets—Sheet 3.
A. WRIGHT.
MAXIMUM AND MINIMUM RECORDING ELECTRIC METER.
No. 583,160. Patented May 25, 1897.
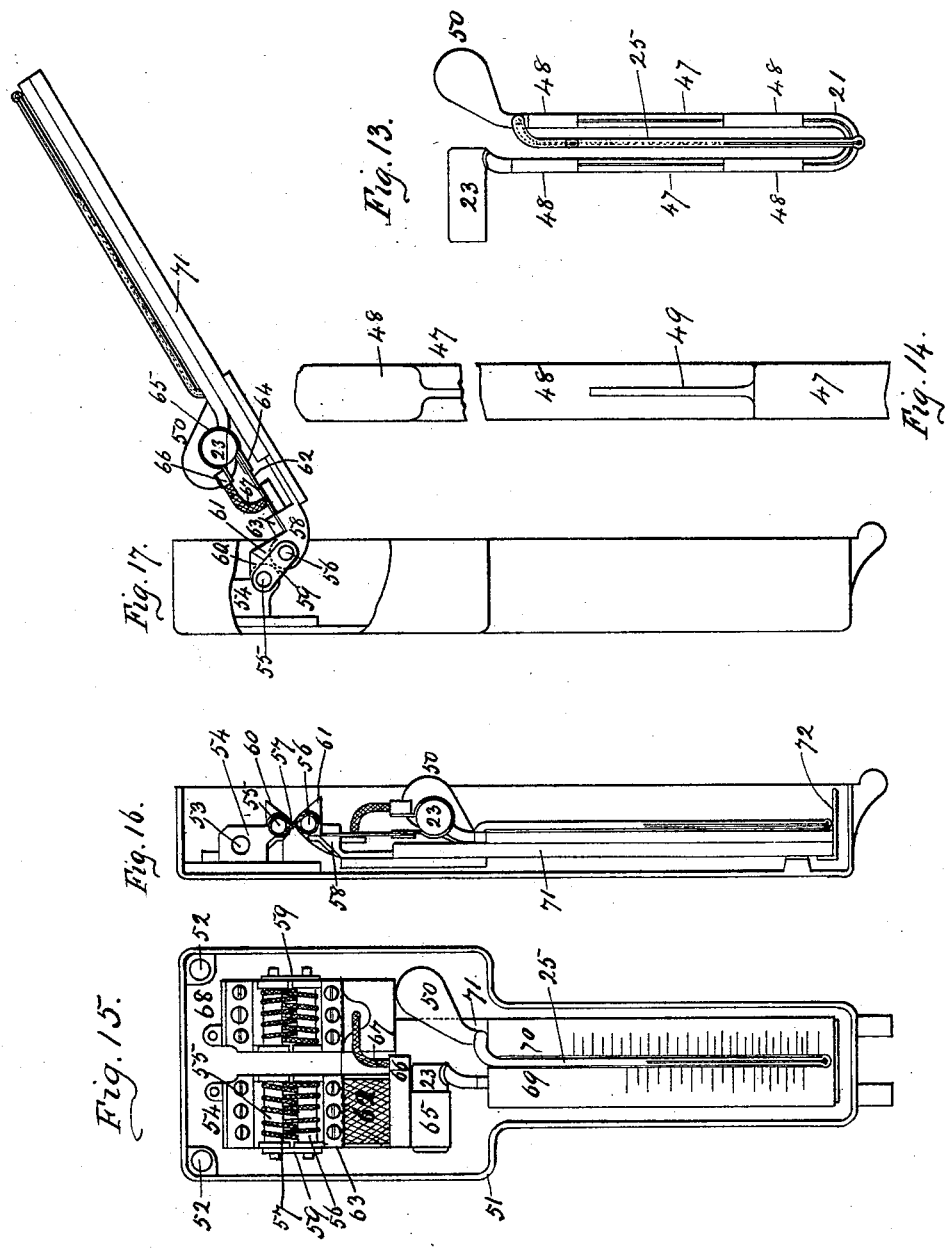
Witnesses:
F. T. Chapman
C. E. Marshall
Inventor,
Arthur Wright
By Joseph Lyons
Attorney

UNITED STATES PATENT OFFICE.

ARTHUR WRIGHT, OF BRIGHTON, ENGLAND.

MAXIMUM AND MINIMUM RECORDING ELECTRIC METER.

SPECIFICATION forming part of Letters Patent No. 583,160, dated May 25, 1897.

Application filed June 12, 1896. Serial No. 595,330. (No model.) Patented in England January 11, 1893, No. 583.

*To all whom it may concern:*

Be it known that I, ARTHUR WRIGHT, a subject of the Queen of Great Britain, and a resident of Brighton, in the county of Sussex, England, have invented certain new and useful Improvements in or Connected with Maximum and Minimum Recording Electric Meters, (for which I have obtained Letters Patent of Great Britain, No. 583, dated January 11, 1893,) of which the following is a specification.

My invention consists mainly in the employment, with an electric meter, of what, for the purposes of this specification, I shall term a "liquid-withdrawing device"—that is to say, a device which shall withdraw from a body of liquid employed in conjunction with an electric meter a part of the said liquid whose amount shall vary with the current passed through the meter and whose physical form shall not be altered while being withdrawn. In stating that the amount of liquid withdrawn varies with the current passed through the meter I desire it to be understood that I do not here employ the term "current" in its specific sense of current quantity or current strength, but I employ the term in its relation to any given characteristic of the current—that is to say, not only its strength or quantity, but also, for example, its pressure or electromotive force or its energy. I further desire it to be understood that I employ the term "electric meter" in its widest sense and as embracing both indicating and integrating instruments.

The object of my invention is to obtain an instrument which will record the maximum or minimum current which has passed during any given period of time.

All electric meters depend for their indications upon the relative movement or change of relative position of a fixed and a movable element or of two movable elements. In carrying my invention into effect, then, I make the amount of such relative movement or change of position vary (though not necessarily directly) with that characteristic of the current whose maximum or minimum it is desired to record and to make the amount of liquid withdrawn vary with the amount of such relative movement or change of position. I shall hereinafter refer to such movement or change of position as "deflection."

In the accompanying drawings, which illustrate various forms of my invention, similar numerals and letters of reference indicate similar parts.

In the said drawings, Figure 1 illustrates, diagrammatically, a form of my invention in which the liquid-withdrawing device consists of a dipping scale. Fig. 2 illustrates, diagrammatically, a form of my invention in which the liquid-withdrawing device consists of a pipette. Fig. 3 diagrammatically illustrates a case in which liquid is withdrawn by decantation or angular movement. Fig. 4 is a diagram illustrating the application of one form of liquid-withdrawing device to an electromagnetic ammeter. Fig. 5 shows the same form of liquid-withdrawing device applied to a hot-wire voltmeter or instrument based upon the expansion of a solid body. Fig. 6 shows a form of instrument based upon the expansion of a liquid. Fig. 7 represents an instrument based upon the expansion of a gas. Fig. 8 is a duplex form of the instrument shown in Fig. 3. Fig. 9 is a duplex form of the instrument shown in Fig. 4. Fig. 10 is a duplex form of the instrument shown in Fig. 5. Fig. 11 is a duplex instrument acting on the same principle as that shown in Fig. 6. Fig. 12 is a duplex form of the instrument shown in Fig. 7. Fig. 13 is a practical form of instrument constituting a maximum recording-ammeter and based on the same principle as the instrument shown in Fig. 7. Fig. 14 is a detail thereof. Fig. 15 is a front elevation of the instrument shown in Fig. 13 mounted and fitted in its case. Fig. 16 is a side elevation thereof with the side of the case removed. Fig. 17 is a side elevation showing the instrument in its tilted position and with part of the case shown as broken away.

In order to obtain a record of the maximum or minimum deflection which has occurred during any given interval of time, I add to the instrument employed (ammeter, voltmeter, wattmeter, or what not) a means for withdrawing an amount of liquid proportional to the maximum or minimum deflection, as the case may be, which has taken place during the said interval of time. One of the simplest ways of obtaining such a record is to lift out of a body of liquid a portion proportional to the deflection. Thus let us assume that we want to know the greatest strength or quantity of the current which has passed through an ordinary ammeter during a period when there has been no one to watch its readings. In such a case I may place a vessel containing a body of liquid in convenient proximity to the movable part of the ammeter, and I attach to the said movable part in any convenient way a lifting contrivance which will dip into the liquid and lift therefrom a portion varying with the depth of immersion.

One convenient form of this type of my invention is shown in Fig. 1, which diagrammatically illustrates the application to a well-known form of ammeter in which a core 1, supported by a spring 2, is sucked into a solenoid 3. To the core is attached the scale 4, dipping into the liquid 5. The greater the current the farther will the core be sucked downward and the deeper will the scale dip into the liquid and the greater will be the amount of liquid which will adhere to the scale and be withdrawn therewith when the deflection ceases or diminishes. In practice, of course, one of the usual devices for keeping the level of the liquid in its vessel constant would be employed and the liquid would be strongly coloring, so as to leave a stain on the scale, which latter would be cleansible or of cheap material easily replaced. It will be seen that the level of the stain on the scale would record the greatest current that had passed during the period that the device had been under its influence. It will also be obvious that the material of which the scale is constructed should not be absorbent or such as to imbibe liquid by capillarity.

Another form of the same type of my invention—namely, that type in which liquid is lifted out of a vessel by the liquid-withdrawing device—is diagrammatically represented in Fig. 2. The only difference between the instrument represented in this figure and that represented in the last lies in the fact that the liquid-withdrawing device in this case consists of a pipette instead of a dipping scale. This pipette is represented at 6, and it is furnished with a small upwardly-opening valve 7 at its lower extremity. It is obvious that the farther the pipette dips into the liquid 5 the more liquid will pass into the interior of the pipette and the greater will be the quantity of liquid withdrawn. The valve 7 serves to prevent the passage of liquid out of the pipette on withdrawal and will also serve to free the liquid from the pipette at will when it is desired to set the instrument for a new reading. Instead of withdrawing a portion of the liquid by lifting it out, it can be withdrawn by causing it to overflow from the vessel containing it. Thus in a second type of my invention the liquid, instead of being withdrawn by being lifted out, is withdrawn by tilting the vessel containing it, the liquid being then decanted from its vessel by causing the latter to be overturned or angularly moved to an extent varying with the deflection. Thus we might attach, say, to the pointer of an ammeter or a voltmeter which in its normal position is vertical a vessel full of liquid, so that the more the pointer became deflected the greater would be the amount of liquid which would be spilled or decanted from the said vessel. Such a device is diagrammatically illustrated in Fig. 3, in which 8 represents the pointer, 9 a deep narrow cylindrical vessel filled with the liquid, and 10 the center of angular movement. 11 is an overflow-pipe through which the liquid overflows on deflection of the pointer 8 and vessel 9 to the right, and 12 is the scale of the instrument. It is obvious that the amount of liquid spilled or decanted from the vessel 9 will be a measure of the maximum deflection of the pointer and will thus give the record desired. Of course in an apparatus of this kind due provision must be made for the spilled liquid being conducted to a suitable receptacle, so as not to spoil the instrument.

Overflow of liquid from a vessel may be brought about otherwise than by decanting or angular movement of the vessel. Thus, for example, it may be brought about by raising the level of the said liquid. The amount of liquid so caused to overflow may, as in the case illustrated in Fig. 3, be ascertained by measuring either the quantity of liquid which has overflowed or the deficiency remaining in the vessel, and either the vessel out of which overflow takes place or the receptacle for the liquid which has overflowed may be marked with a scale for the purpose of such measurement.

In Fig. 4 I diagrammatically illustrate the application of a liquid-withdrawing device (in which overflow is produced by raising the level of the liquid) to the well-known form of ammeter illustrated in Figs. 1 and 2. In this case, instead of attaching a dipping scale or a pipette to the core, I attach a plunger 13, dipping into the liquid 5, contained in the vessel 14. Immediately above the level of the liquid is the orifice of the overflow-pipe 15. 16 is the receptacle in which the liquid which is caused to overflow collects, and this receptacle may conveniently be marked with a scale 17. It is obvious that the greater the current passed through the solenoid the farther will the plunger dip into the liquid, the higher will the level of the liquid rise, and the greater will be the amount of liquid pressed through the overflow-pipe into the receptacle. The scale 17 will show the amount of liquid so caused to overflow; but, if desired, the scale might be marked upon the vessel 14, in which case the deficiency in that vessel would indicate the amount which had been caused to overflow.

In Fig. 5 I diagrammatically illustrate the same form of liquid-withdrawing device in conjunction with a voltmeter of the Cardew or hot-wire type. In this instrument 18 is a thin platinum wire supported at one extremity to the fixed point 19 and having at its other extremity the heavy plunger 13, dipping in liquid contained in a vessel, as in Fig. 4. When current passes through the wire 18, the latter is heated and consequently expands in length, the plunger dipping farther into the vessel and causing more liquid to overflow the higher the degree to which the wire is heated. As the wire expands in length in proportion to the heat generated in it, and as the said heat varies with the electromotive force, as in an ordinary Cardew voltmeter, it is obvious that the amount of liquid caused to overflow will give a record of the maximum electromotive force which the current traversing the wire has attained during any given period.

In Fig. 6 the level of the liquid, instead of being raised by means of a plunger dipping into it, is raised by its own expansion under the influence of heat from an immersed heating resistance. In this figure, 14 is a vessel having an upwardly-extending tube 20 and containing a liquid 5. 15 is the overflow-pipe, as before, and 21$^a$ is a heating-resistance in the body of the liquid. As current passes through this resistance it becomes heated more or less, and heating and consequent expansion of the liquid take place with overflow, as before described, the quantity of liquid caused to overflow giving, as before, a record of the maximum current, or, according to construction, the maximum electromotive force during any given period.

In Fig. 7 I illustrate diagrammatically a case in which the level of the liquid is raised, so that overflow may take place, by the expansion of air or gas produced by the current in a heating-resistance. In this figure, 21 is a U-tube filled with a suitable liquid 22 and having at one end the bulb 23, filled with air or gas. This bulb is surrounded by the heating-resistance 24. At the other end of the U-tube is a tube 25, sealed at its lower extremity and opening at its upper extremity into the U-tube. This tube acts as a receptacle for the liquid which has overflowed, the amount of which may be read off by the scale 17, as before. It will be seen that the greater the current passed through the heating-resistance the greater will be the expansion of the gas in the bulb and the greater will be the rise of level in the right-hand limb of the U-tube, and consequently the greater the amount of liquid withdrawn.

It is obvious that as the maximum movement of the movable part of the electric meter in one direction will cause maximum current, electromotive force, or other characteristic to be recorded, so maximum movement in the other direction will cause the minimum current, electromotive force, or other characteristic to be recorded, if a second liquid-index be employed.

Figs. 8, 9, 10, 11, and 12 illustrate diagrammatically cases corresponding with those illustrated in Figs. 3, 4, 5, 6, and 7, but adapted to give minimum as well as maximum records, according as one or other of the two liquid-withdrawing devices employed is affected.

Fig. 8 illustrates a liquid-withdrawing device similar to that shown in Fig. 3, but the instrument is of duplex form—that is to say, it is adapted to record not only the maximum deflection which has taken place during a given period, but also the minimum deflection which has taken place during that period. There is, however, another difference between the two cases illustrated in Figs. 3 and 8, respectively, for whereas in Fig. 3 the needle or pointer is set to be in a vertical position at zero reading, in Fig. 8 the pointer is assumed to be set so as to be vertical at a mean or normal reading, or, in other words, to be vertical when indicating a mean or normal current, electromotive force, or what not, according to the characteristic which the instrument measures. In the figure, 26 26 are two lateral pins attached to the pointer 8 and adapted to push against the two vessels 9 9, which contain the liquid to be decanted. The vessels 9 9 are retained normally in a vertical position by means of the tension-springs 27 27, attached at one end to a fixed support and at the other end to the pins 28 28, which abut against the stops 29 29. Increase of current above the normal, assuming the instrument to be an ammeter, will cause the right-hand pin 26 to press upon the right-hand vessel 9, so that there will be overflow through the pipe 11. Similarly decrease of current below the normal will cause the left-hand pin to press upon the left-hand vessel and cause part of its contents to be decanted.

In Fig. 9, where the instrument is also assumed to be set for a mean or normal current, 30 31 are two pins attached to the rod 32, connected with the core 1. Pin 30 presses upon the upper surface of the maximum lever 33, which turns on the fulcrum 34, while pin 31 presses on the under surface of the minimum lever 35, which turns on the fulcrum 36. It will be seen that increase of current will cause the light plunger to dip farther into the liquid of the maximum-recording device M, while decrease of current will cause the other light plunger to dip farther into the liquid of the minimum-recording device N.

In Fig. 10, which corresponds in principle with Fig. 5, and in which it is assumed that the instrument is set for a mean or normal electromotive force, 18 is the wire through which the current passes, as before, and 37 is a similar wire through which no current passes, while 38 is a spring for putting the necessary strain on the two wires. 39 is a lever to which wires 18 and 37 are attached, the point 40, at which wire 37 is attached, serving as a fulcrum for the said lever. It will be seen that increase of electromotive force will cause wire 18 to expand and the plunger to dip farther into the liquid of the maximum device M, while decrease of electromotive force will cause wire 18 to shrink and the other plunger to dip farther into the liquid of the minimum device N.

In Fig. 11, which corresponds in principle with Fig. 6, 41 is a lever pivoted at 42 to the upright 43, attached to the side of the vessel containing the expansible liquid. This vessel, which is full of liquid, has a tight flexible cover 44, resembling that of an aneroid barometer-box, which cover is articulated to lever 41 by means of the link 45. This instrument being set for a mean current, it is obvious that increase of current will cause increased dipping of the plunger in the maximum device M, while decrease of current will cause increase of dipping in the minimum device N.

Fig. 12 illustrates diagrammatically a duplex form of the instrument shown in Fig. 7. In this case there are two bulbs 23 and 46, the latter having no heating resistance, and two receptacles 25 25 for the liquid caused to overflow. This instrument being set for a mean or normal current, it is clear that increase of current will cause expansion of the gaseous contents of the left-hand bulb and overflow into the right-hand receptacle, while decrease of current will cause contraction of the gaseous contents of the left-hand bulb and overflow into the left-hand receptacle.

In Figs. 13 to 17 I illustrate an actual maximum-recording ammeter as I prefer to construct it. It will be seen that it is similar in principle and type to that illustrated in Fig. 7.

Referring to Fig. 13, 23 is the bulb to which the heating resistance is to be applied and which is preferably made of the shape shown. 21 is the U-tube, the bore of which is made of small diameter at the parts 47, but of large diameter at the parts 48, so that the latter may serve as reservoirs for the liquid. Within the two enlarged parts 48, which are nearest the bottom or bend of the U-tube, I insert a trap for the liquid, consisting of the capillary tube 49, which extends upward through about half of the enlarged space 48, as will be seen in the diagrammatic representation, Fig. 14. 50 is the bulb which I term the "compression-chamber," the air in it being compressed as expansion takes place in the bulb 23.

The apparatus shown in Fig. 13 and which is preferably made of blown-glass is shown mounted in its case in Figs. 15, 16, and 17, Fig. 15 being a face view with the front cover removed, Fig. 16 a side elevation with the side of the case removed, and Fig. 17 a side elevation showing the U-tube tilted for the purpose of resetting and a part of the side of the case being shown broken away in order that the joint or hinge may be clearly seen. In these figures, 51 is the iron case, which can be attached to a wall or board by screws passing through the orifices 52 52. 53 is the orifice in terminal block 54, within which is inserted the end of the circuit-wire leading to the instrument. Upon this block 54 is mounted the contact-cylinder 55, which latter is connected to a similar contact-cylinder 56 by means of the bare flexible conducting-cord 57. The contact-cylinder 56 is mounted upon the conducting-block 58. The conducting-cord 57 passes around and between the two contact-cylinders 55 and 56 after the manner of a figure 8, as is clearly shown in the drawings, its two ends being clamped to the blocks 54 and 58, respectively. This arrangement secures excellent and equable contact in all positions of the instrument and serves as an efficient electrical and mechanical hinge. This hinge is mechanically strengthened by the links 59 59. The projections 60 61 serve as stops when they are brought into contact, as is shown in Fig. 17. 62 is a flat conductor secured in contact with block 58 by means of the clamping-strip 63 and screws. To the other end of this flat conductor is clamped, by means of the clamping-plate 64, one end of the thin flat platinoid conductor 65, which passes round the bulb 23 in close contact therewith and serving as a heating resistance. The other end of the heating resistance is clamped at 66 to the flexible conductor 67. The current after entering the instrument passes by terminal block 54, contact-cylinders and flexible cord 57, conductor 62, heating resistance 65, conductor 67, and thence by conducting parts similar to those already described and as are clearly shown in Fig. 15 to terminal block 68, to which the other circuit-wire leading from the instrument is attached. The U-tube, the greater part of which is hidden from view in Fig. 15 by the scales 69 70, is mounted on a board 71, to the lower or free end of which is attached the handle 72, (shown only in Fig. 16,) by means of which the instrument is tilted into the position shown in Fig. 17 for the purposes of resetting.

The action of this form of my invention will be clearly understood from what has already been said. Current passing through the heating resistance 65 causes liquid to be spilled over into the receptacle 25, where by means of one of the scales shown the amount of such liquid may be indicated. On the other scale may be marked the maximum current in amperes corresponding with the amount of liquid in the receptacle 25, or the scales may be marked to give such other information as may be desired—such, for example, as the amount of current which must be used before a rebate in price is made or the amount of such rebate.

To reset the instrument, all that has to be done is to grasp the handle 72 and tilt the instrument into the position shown in Fig. 17. The effect of this is that the liquid in the receptacle 25 flows into the compression-bulb 50, as does also a little from the right-hand limb of the U-tube. The capillary tubes 49, however, prevent the flow of the body of the liquid in the U-tube into this bulb. When the U-tube is restored to its normal position, as shown in Figs. 15 and 16, the liquid flows out of bulb 50 back into the U-tube, and is aided in this by the shape and inclination of of the said bulb 50, as is clearly shown in the drawings. It will be noticed also that the receptacle 25 is placed in a plane forward of that of the U-tube, so that when the latter is brought back to its normal position liquid will flow into it and not into the said receptacle. On tilting the instrument a little liquid may also pass into the expansion-bulb 23, but this will readily flow back again into the U-tube when the instrument is restored to its normal position.

Resetting of the other forms of instrument herein represented may be accomplished in the following manner: In the case illustrated in Fig. 1, in which I use a scale dipping into liquid, resetting may be effected by wiping off the stain left on the scale or by the substitution of a new scale, which may be made of glazed paper or other cheap material. When the liquid is withdrawn by a pipette, as in Fig. 2, the same object may be accomplished by opening the valve to allow the liquid to run out of the pipette. In the other forms shown the instrument can be reset by redecanting the liquid from the receptacle back into the vessel from which it has overflowed.

I find that the best liquid to employ is one which is difficult to volatilize, but any liquid stable under ordinary conditions and variations of temperature will give good results.

In connection with my invention I may, when desired, employ any of the known means for compensating for temperature errors and of shielding the instruments from variations of temperature; and I may also employ any known damping or dashpot device to obviate errors due to momentum.

I desire it to be understood that I do not limit myself to the means by which deflection is brought about. Any principle or means used in electrical measuring instruments for the purpose of obtaining deflection may be employed.

What I claim, and desire to secure by Letters Patent of the United States, is—

1. The method of recording an extreme limit of the range of a variable characteristic of an electric current, within a certain period of time, by causing a movement of a body, or bodies, commensurate therewith; indicating, by the extent of such movement, the said limit, and preventing further record-indicating movement of said body or bodies.

2. The method of recording an extreme limit of the range of a variable characteristic of an electric current, within a certain period of time, which consists in withdrawing from a body of liquid portions thereof by the action of the said current characteristic and commensurate with the said extreme limit thereof, substantially as described.

3. The method of recording an extreme limit of the range of a variable characteristic of an electric current, within a certain period of time, which consists in withdrawing from a body of liquid a portion of the same by and commensurate with the heating effect of the said current at the extreme range limit recorded, substantially as described.

4. A meter for recording the extreme limit of the range of a variable characteristic of an electric current, within a certain period of time, comprising a vessel containing a liquid, an electric heating-coil in operative relation to said vessel for heating the same by and in accordance with said current characteristic to cause an overflow of the liquid from said vessel, and a receptacle communicating with said vessel for receiving the overflow, substantially as described.

5. A meter for recording the highest maximum of a variable characteristic of an electric current within a certain time limit, comprising a U-shaped tubular vessel containing a liquid, an electric heating-coil in operative relation to one end of said vessel, and a receptacle at the other end of the vessel arranged to receive the overflow, from the vessel, caused by the heat of the coil, substantially as described.

6. A recording electric meter comprising a U-shaped tube containing a liquid and terminating at each end in a bulb or enlargement, an electric heating-coil surrounding the bulb at one end of the tube, and a tube or receptacle communicating with the first-named tube adjacent to the second bulb, substantially as described.

7. A recording electric meter, comprising a U-shaped tube having a bore of alternate large and small diameter and terminating at each end in a bulb or enlargement, and containing a liquid, an electric heating-coil surrounding one of the bulbs, and a tube or receptacle communicating with the first-named tube adjacent to the other bulb, substantially as described.

8. A recording electric meter, comprising a sealed U-shaped tube containing a liquid and having a bulb at the upper end of each leg, an electric heating-coil surrounding one of the bulbs, a tube or receptacle connected to and communicating with the first-named tube adjacent to the other bulb, a support for the tubes, and a casing or box to which the support is hinged, substantially as described.

In testimony whereof I have hereunto set my hand, this 15th day of May, 1896, in the presence of the two subscribing witnesses.

ARTHUR WRIGHT.

Witnesses:
WILLIAM HENRY JORDAN,
HARRY WILLIAM BURSTOW.